(12) United States Patent
Tasser

(10) Patent No.: US 11,542,687 B2
(45) Date of Patent: Jan. 3, 2023

(54) ASSEMBLY FOR MEASURING A LEAKAGE IN A DRINKING WATER SUPPLY SYSTEM, AND PRESSURE REDUCER

(71) Applicant: Pittway Sarl, Rolle (CH)

(72) Inventor: Peter Tasser, Eberbach (DE)

(73) Assignee: Pittway Sarl, Rolle (CH)

( * ) Notice: Subject to any disclaimer, the term of this patent is extended or adjusted under 35 U.S.C. 154(b) by 285 days.

(21) Appl. No.: 16/838,255

(22) Filed: Apr. 2, 2020

(65) Prior Publication Data

US 2020/0354929 A1  Nov. 12, 2020

(30) Foreign Application Priority Data

May 8, 2019  (DE) .......................... 102019111977.4

(51) Int. Cl.
*E03B 7/00* (2006.01)
*E03B 7/07* (2006.01)
*G01M 3/28* (2006.01)

(52) U.S. Cl.
CPC .............. *E03B 7/003* (2013.01); *E03B 7/072* (2013.01); *E03B 7/077* (2013.01); *G01M 3/2807* (2013.01)

(58) Field of Classification Search
CPC ...... E03B 7/00–07; E03B 7/003; E03B 7/072; E03B 7/077; F17D 5/00–02;
(Continued)

(56) References Cited

U.S. PATENT DOCUMENTS 5,568,825 A * 10/1996 Faulk .................. G01M 3/2807
137/552
5,637,789 A   6/1997 Lawson
(Continued)

FOREIGN PATENT DOCUMENTS

CN    107326963 A    11/2017
CN    104764495 B  *  1/2018  ............... G01F 1/28
(Continued)

OTHER PUBLICATIONS

Sensirion AG, "LD20-2600B Liquid Flow Sensor, Single-Use Liquid Flow Sensor for Biomedical Applications," 1-900055-01, retrieved from https://www.sensirion.com/en/flow-sensors/liquid-flow-meters/page/ld20-disposable-flow-sensors/, Aug. 4, 2020, 2 pp.
(Continued)

*Primary Examiner* — Nguyen Q. Ha
(74) *Attorney, Agent, or Firm* — Shumaker & Sieffert, P.A.

(57) ABSTRACT

Assembly (10) for measuring a leakage in a drinking water supply system, with a backflow preventer (12), wherein the backflow preventer (12) is opened if there is a pressure drop caused by drinking water consumption downstream of the backflow preventer (12) as viewed in a flow direction of the drinking water, and wherein the backflow preventer (12) is closed if there is no pressure drop caused by drinking water consumption downstream of the backflow preventer (12), as viewed in the flow direction of the drinking water, with a volume flow meter (13) connected in parallel to the backflow preventer (12) and via which, if the backflow preventer (12) is closed, a leakage flow of drinking water caused by a leakage in the drinking water supply system downstream of the backflow preventer (12) can be routed, wherein the volume flow meter (13) is integrated into a bypass (14) to the backflow preventer (12).

12 Claims, 4 Drawing Sheets

Figure 1:
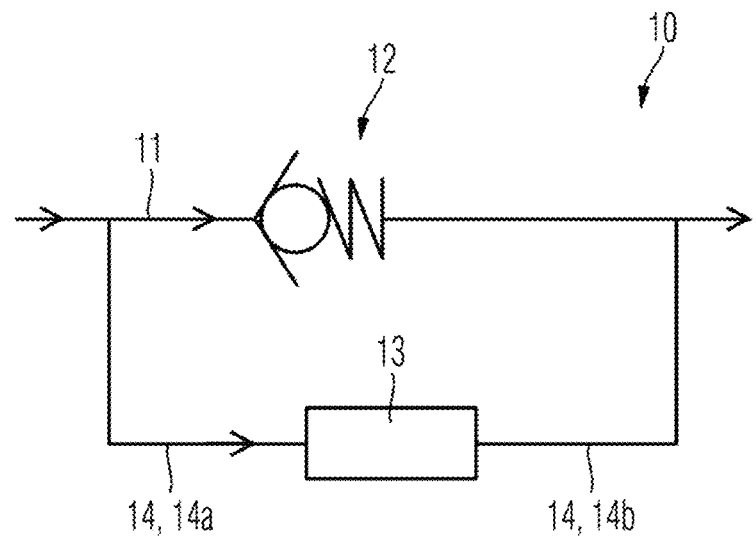

(58) Field of Classification Search
CPC .. G01M 3/00; G01M 3/26–28; G01M 3/2807; G01M 3/2815
See application file for complete search history.

(56) References Cited

U.S. PATENT DOCUMENTS

| | | | |
|---|---|---|---|
| 8,720,481 B2 | 5/2014 | Guy | |
| 9,297,467 B1 * | 3/2016 | Goseco | F16K 17/36 |
| 9,366,582 B2 * | 6/2016 | Rosca | F16K 17/003 |
| 10,443,880 B2 * | 10/2019 | Evans | F16K 37/005 |
| 10,473,494 B2 * | 11/2019 | Allen | G01F 1/22 |
| 2003/0192377 A1 | 10/2003 | Ford | |
| 2008/0149180 A1 * | 6/2008 | Parris | F16K 27/12 700/282 |
| 2014/0196802 A1 * | 7/2014 | Guy | G01M 3/2807 137/486 |
| 2014/0332088 A1 | 11/2014 | Senesh | |

FOREIGN PATENT DOCUMENTS

| | | | |
|---|---|---|---|
| CN | 207556599 U * | 6/2018 | G01F 1/56 |
| DE | 197 06 564 A1 | 8/1998 | |
| DE | 20105191 U1 | 5/2002 | |
| DE | 102011101081 A1 | 11/2012 | |
| DE | 102019129324 A1 * | 5/2021 | F17D 5/02 |
| EP | 3032236 A1 | 6/2016 | |
| EP | 3239682 A1 | 11/2017 | |
| WO | 2014/029699 A1 | 2/2014 | |
| WO | 2017143895 A1 | 8/2017 | |

OTHER PUBLICATIONS

Search Report of the Intellectual Property Office of Germany for DE102019111977.4 with search date of Jan. 8, 2020.

* cited by examiner

ASSEMBLY FOR MEASURING A LEAKAGE IN A DRINKING WATER SUPPLY SYSTEM, AND PRESSURE REDUCER

CROSS-REFERENCE TO RELATED APPLICATIONS

This application claims the benefit of German Patent Application No. 102019111977.4 filed May 8, 2019, the disclosure of which is herein incorporated by reference in its entirety.

The invention relates to an assembly for measuring a leakage in a drinking water supply system. Furthermore, the invention relates to a pressure reducer.

In drinking water supply systems of houses or buildings, both pressure reducers and backflow preventers can be installed. The basic structure and the basic functioning of pressure reducers and backflow preventers are familiar to the person skilled in the art addressed here. Thus, DE 10 2011 101 081 A1, for example, discloses the basic structure and basic functioning of a pressure reducer. The basic structure and basic functioning of a backflow preventer is known from DE 201 05 191 U1, for example.

If a leakage occurs in a drinking water supply system, this can lead to considerable damage to the building or house in which the drinking water supply system is installed. The detection of a leakage is thus of great importance. So far, however, it has been difficult to reliably detect particularly small leakages.

From EP 3 032 236 B1, a device for detecting a leakage in a drinking water supply system is known.

From EP 3 239 682 A1, another device for the detection of leakages in a drinking water supply system is known.

Although devices that can be used to detect leakages in a drinking water supply system are already known, the detection of small leakages by simple means has so far caused difficulties.

Starting from this, the present invention is based upon the aim of creating a novel assembly for measuring a leakage in a drinking water supply system, and a novel pressure reducer.

This aim is achieved by an assembly for measuring a leakage in a drinking water supply system according to claim 1. The assembly according to the invention for measuring a leakage in a drinking water supply system comprises a backflow preventer, wherein the backflow preventer is open if there is a pressure drop caused by regular drinking water consumption downstream of the backflow preventer, as viewed in a flow direction of the drinking water, and wherein the backflow preventer is closed when there is no pressure drop caused by regular drinking water consumption downstream of the backflow preventer, as viewed in the flow direction of the drinking water.

The assembly according to the invention for measuring a leakage in a drinking water supply system further comprises a volume flow meter connected in parallel to the backflow preventer and via which, if the backflow preventer is closed, a leakage flow of drinking water caused by a leakage in the drinking water supply system downstream of the backflow preventer can be routed, wherein the volume flow meter is integrated into a bypass to the backflow preventer, and wherein the volume flow meter is preferably designed for a measuring range of between 0.1 mL/min and 20 mL/min.

With the assembly according to the invention, it is possible with simple means to measure very small leakages—in particular, on the order of magnitude between 0.1 mL/min and 20 mL/min—in a drinking water supply system. Thus, the assembly has the backflow preventer along with the volume flow meter connected in parallel to the backflow preventer. Then, if there is no regular consumption of drinking water in the drinking water supply system, e.g., by opening a tap or the like, the backflow preventer is closed.

If a leakage occurs downstream of the backflow preventer, a leakage flow caused by this is routed via the bypass and thus through the volume flow meter integrated into the bypass. This is integrated into the bypass and designed for a measuring range preferably between 0.1 mL/min and 20 mL/min. This is a particularly advantageous way of detecting small leakages in the drinking water supply system.

Preferably, the volume flow meter has a flow channel with a flow cross-section of between 2 mm and 4 mm, wherein the bypass into which the volume flow meter is integrated has a flow cross-section of between 2 mm and 4 mm, viz., a flow cross-section designed for a flow cross-section of the volume flow meter. Such flow cross-sections of the bypass and the volume flow meter are particularly advantageous for the detection of small leakages.

According to an advantageous development of the invention, the assembly according to the invention for measuring a leakage in a drinking water supply system comprises a pressure reducer that, viewed in the flow direction of the drinking water, is arranged upstream of the backflow preventer. The combination of the backflow preventer and the volume flow meter with a pressure reducer, which is arranged upstream of the backflow preventer, is particularly preferred. This makes it possible to limit the pressure range to which the volume flow meter is exposed. This is preferred for the advantageous detection of small leakages in a drinking water supply system.

Preferably, the pressure reducer has a housing with an inlet, with an outlet, with an upstream pressure zone coupled to the inlet, and a downstream pressure zone coupled to the outlet, wherein the pressure reducer has a valve insert accommodated in the housing, which, in the closed state, separates the upstream pressure zone from the downstream pressure zone and, in the open state, connects the upstream pressure zone and the downstream pressure zone.

In the case of a pressure reducer, the backflow preventer is integrated into the pressure reducer in the area of the downstream pressure zone and/or of the outlet of the housing, wherein the bypass into which the volume flow meter is integrated is formed by the housing of the pressure reducer. Such a design is compact and simple, and therefore particularly preferred.

The pressure reducer according to the invention is defined in claim 8.

Figure 2:
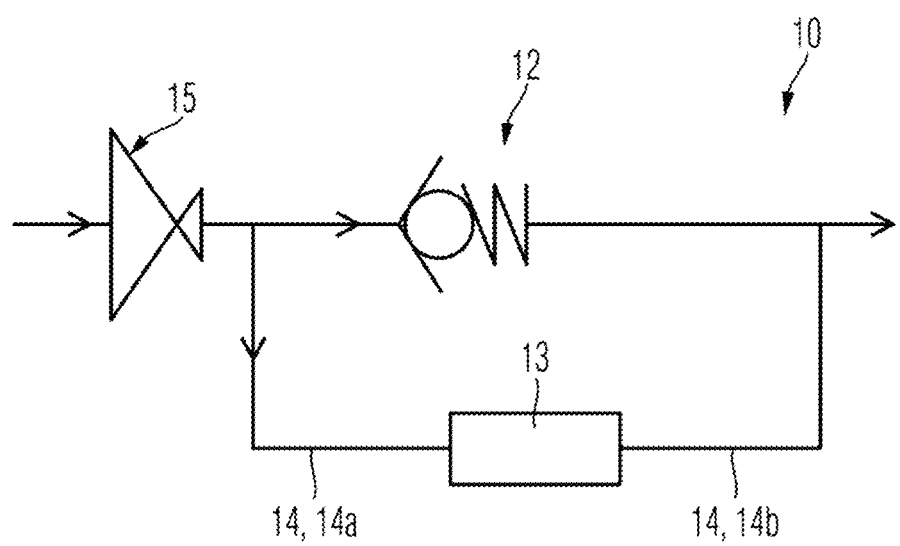
Figure 3:
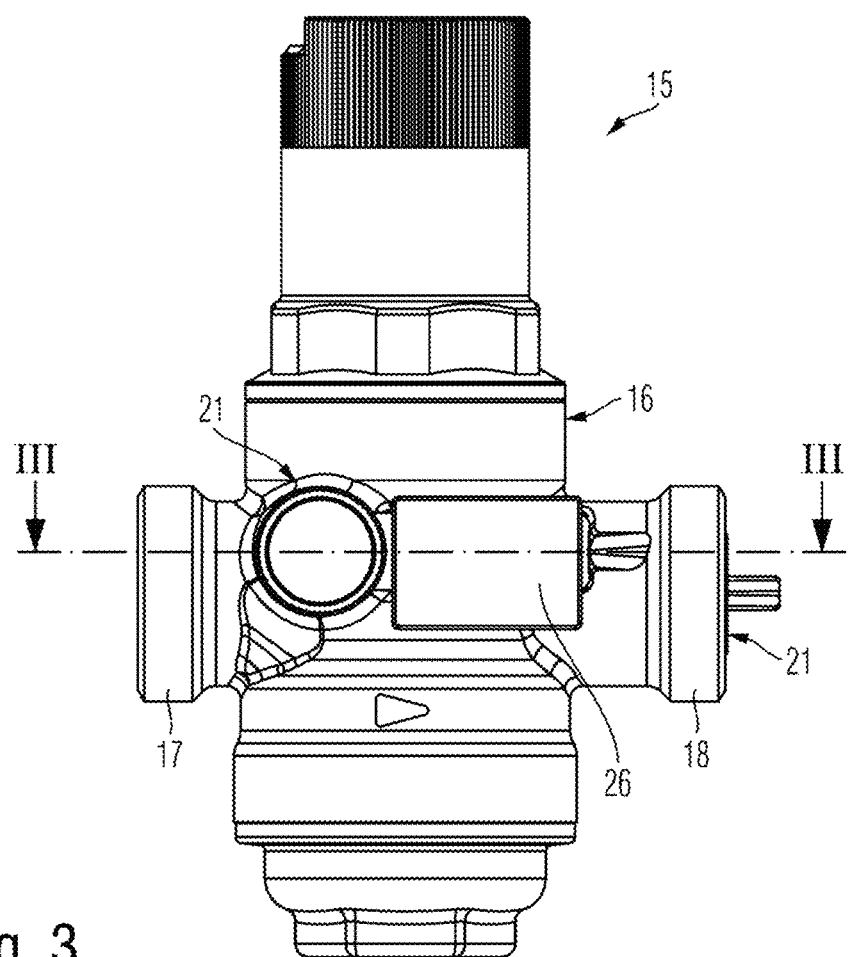
Figure 4:
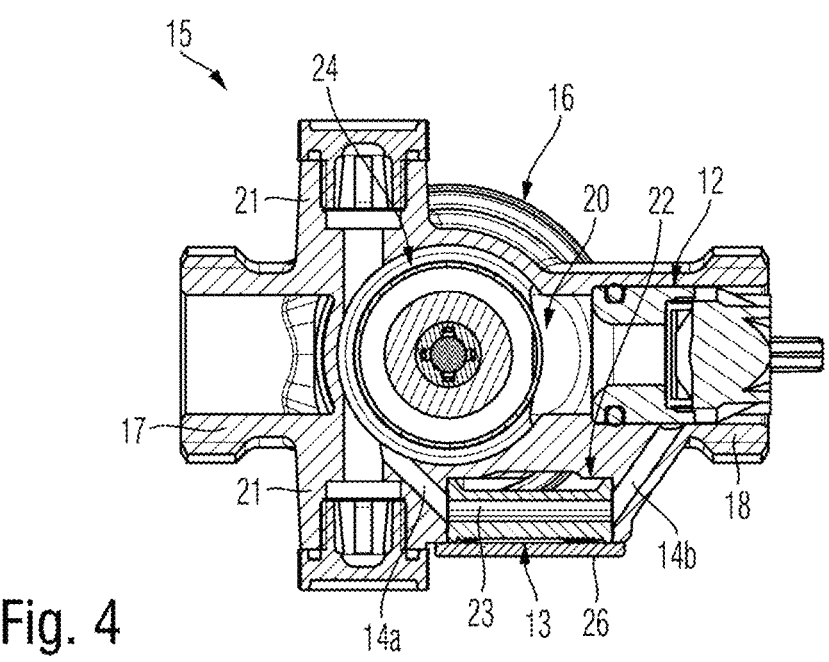
Figure 6:
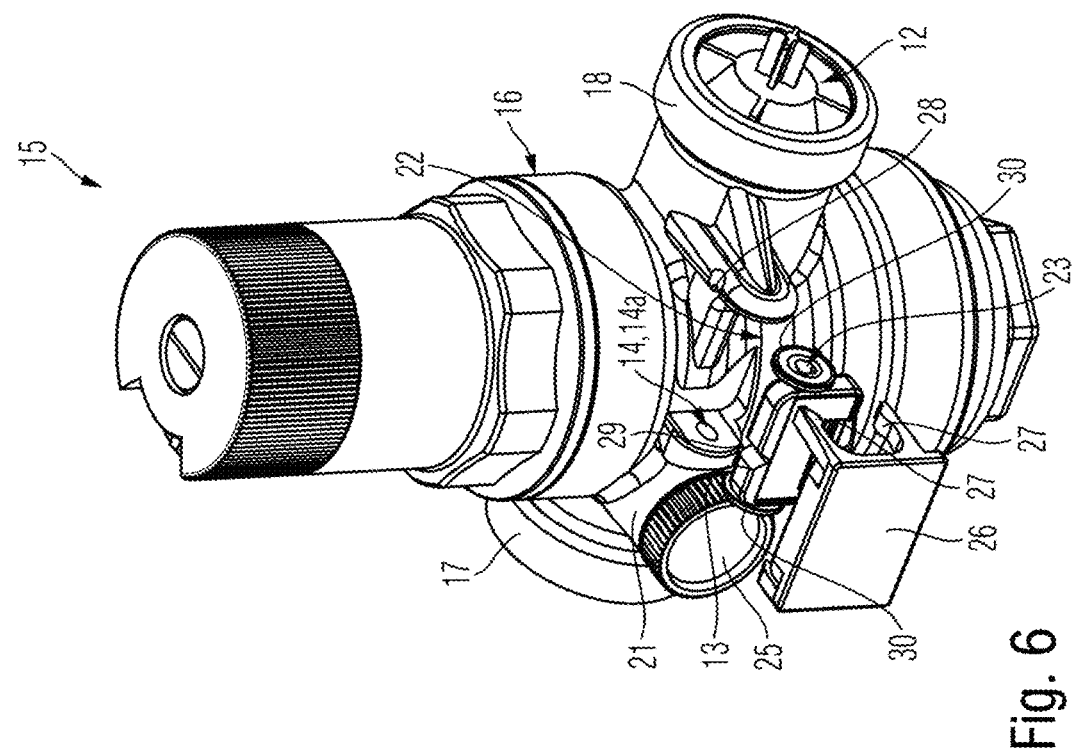
Figure 5:
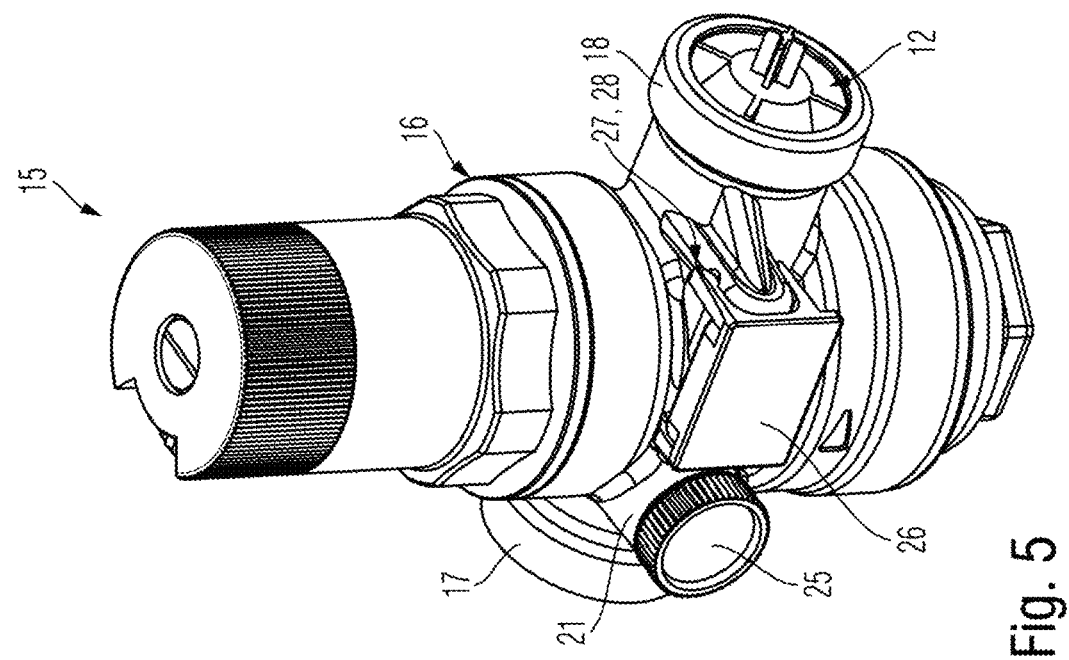
Figure 7:
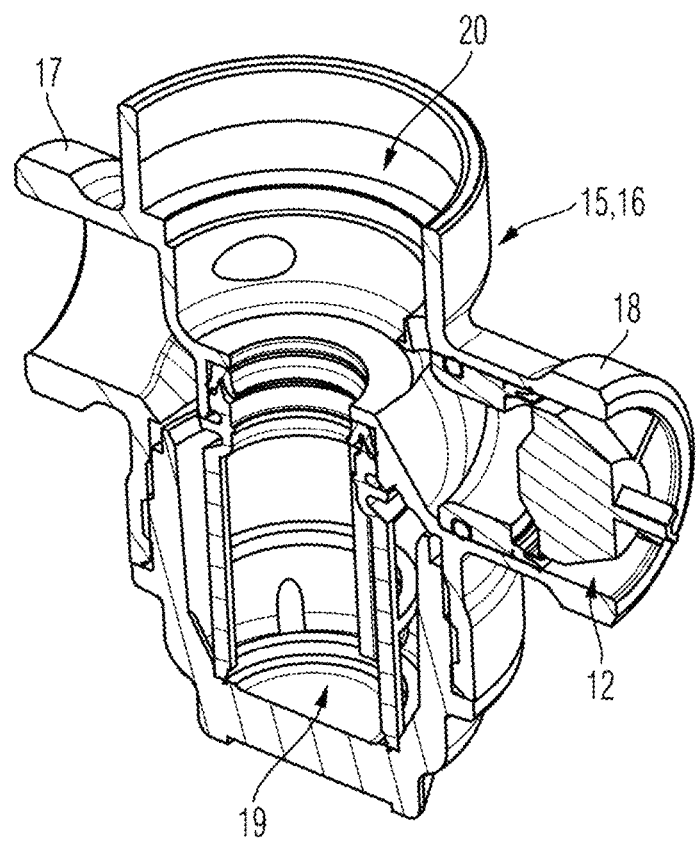

Preferred developments of the invention result from the subclaims and the following description. Exemplary embodiments are explained in more detail by means of the drawing, without being limited to this. Thereby, the following are shown:

FIG. 1 a block diagram of an assembly according to the invention for measuring a leakage in a drinking water supply system;

FIG. 2 a block diagram of a development of the assembly of FIG. 1;

FIG. 3 a side view of a structural design of the assembly of FIG. 2;

FIG. 4 the cross-section III-III of FIG. 2;

FIG. 5 a perspective view of the structural design of FIG. 2;

FIG. 6 the structural design of FIG. 2 in a partial exploded view;

FIG. 7 a cross-section of a detail of the structural design of FIG. 2; and

Figure 8:
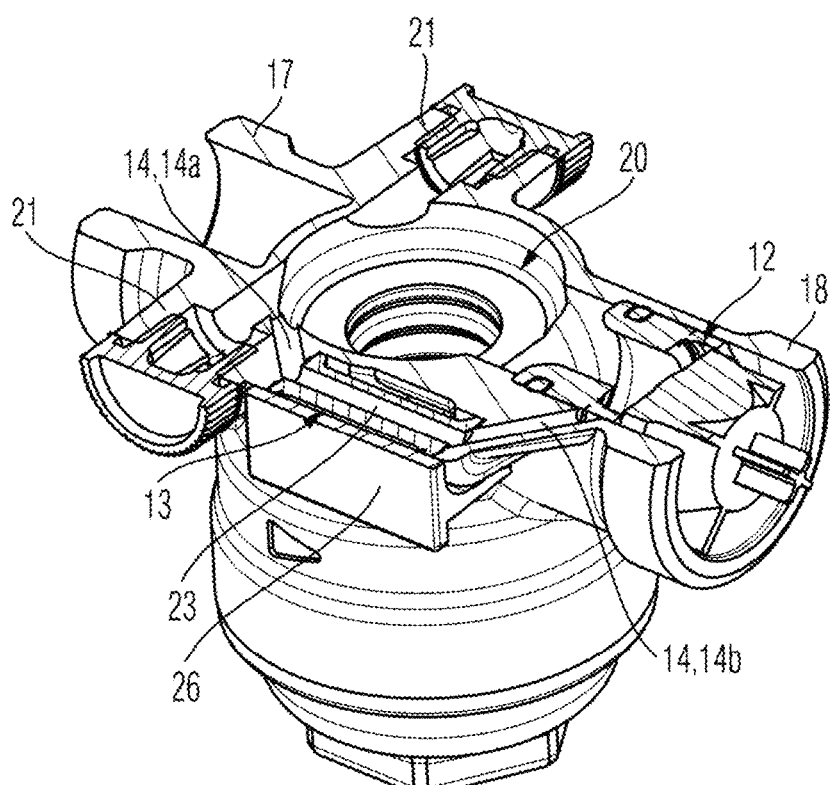

FIG. 8 an additional cross-section of a detail of the structural design of FIG. 2.

FIG. 1 shows a block diagram of a first assembly 10 according to the invention for measuring a leakage in a drinking water supply system.

FIG. 1 thus shows a backflow preventer 12 integrated into a drinking water supply line 11. Then, if there is a pressure drop at the backflow preventer 12 caused by a regular drinking water consumption downstream of backflow preventer 12 and greater than a limit value, the backflow preventer 12 is opened. If, on the other hand, there is no regular drinking water consumption downstream of the backflow preventer, i.e., a pressure drop at the backflow preventer 12 is less than the limit value, the backflow preventer 12 is closed.

Drinking water consumption, as a result of which the backflow preventer 12 opens, is regular drinking water consumption caused, for example, by opening a drinking water tap or other drinking water extraction point.

A volume flow meter 13 is connected in parallel to the backflow preventer 12. If the backflow preventer 12 is closed, a leakage flow of drinking water in a drinking water supply system caused by a leakage downstream of the backflow preventer 12 can be routed through the volume flow meter 13 connected in parallel to the backflow preventer 12. Thereby, the volume flow meter 13 is integrated into a bypass 14 to the backflow preventer 12, wherein the bypass 14 branches off the drinking water supply line 11 upstream of the backflow preventer 12 and opens into the drinking water supply line 11 downstream of the backflow preventer 12.

If a small leakage occurs in the drinking water supply system downstream of the backflow preventer 12, and thereby a leakage flow of drinking water is formed as a result of which the backflow preventer 12 does not open, such leakage flow of drinking water will flow through the volume flow meter 13. This volume flow meter 13 is integrated into the bypass 14 and provides a lower flow resistance than the backflow preventer.

A relatively small and inexpensive volume flow meter, also known as a microflow sensor, can be used in the bypass 14. This is preferably designed for a measuring range of between 0.1 mL/min and 20 mL/min. A droplet with a droplet diameter of 5 mm has a volume of 0.055 mL. Accordingly, leakages on the order of magnitude of 2 droplets per minute to 400 droplets per minute can be detected.

Such a volume flow meter 13 preferably has a flow channel 23 with a flow cross-section of between 2 mm and 4 mm.

The bypass 14, into which the volume flow meter 13 is integrated, has a flow cross-section that is adapted to the flow cross-section of the volume flow meter 13, i.e., a flow cross-section of preferably between 2 mm and 4 mm.

Such volume flow meters are known, for example, from the brochure entitled "LD20-2600B Liquid Flow Sensor, Single-Use Liquid Flow Sensor for Biomedical Applications, Sensirion AG, February 2018." For the first time, the invention proposes using volume flow meters, which have so far been used in biomedical applications, for leakage detection in a drinking water supply system of a building or house.

FIG. 2 shows a development of the assembly according to the invention which includes a pressure reducer 15 in addition to the backflow preventer 12 and the volume flow meter 13. Viewed in the direction of the flow of drinking water, the pressure reducer 15 is arranged upstream of the backflow preventer 12.

Depending upon its design, the pressure reducer 15 limits a drinking water supply pressure, which is, in particular, on the order of magnitude of up to 16 bar, to a pressure on the order of magnitude of between 0.5 bar and 12 bar. It is possible, at the pressure reducer 15, to set the pressure to which the pressure reducer 15 limits the supply pressure offered.

This has the advantage that damage to the volume flow meter 13 due to excessive pressures can be safely avoided.

FIGS. 3 through 8 show details of a preferred structural design of the assembly 10 of FIG. 2. FIGS. 3 through 5 show a housing 16 of a pressure reducer 15, wherein the housing 16 of the pressure reducer 15 provides an inlet 17, an outlet 18, an upstream pressure zone 19 connected to the inlet 17, and a downstream pressure zone 20 connected to the outlet 18. An inlet 17 and an outlet 18 provide, so to speak, a section of the drinking water supply line 11. The housing 16 also provides an accommodation space for a valve insert 24 of the pressure reducer 15 that, in the closed state, separates the upstream pressure zone 19 from the downstream pressure zone 20.

FIGS. 3 through 8 also show connections 21 for pressure measuring devices—in particular, for measuring the pressure in the downstream pressure zone. Such connections 21 are closed by plugs 25.

The housing 16 of the pressure reducer 15 accommodates the backflow preventer 12 in the area of the outlet 18. Therefore, the backflow preventer 12 is exposed to the pressure in the downstream pressure zone 20 of the pressure reducer 15. If the valve insert 24 of the pressure reducer 15 is closed, the upstream pressure zone and the downstream pressure zone are separated from each other. When the valve insert 24 is open, however, the upstream pressure zone 19 and the downstream pressure zone 20 are coupled.

The housing 16 of the pressure reducer 15 forms the bypass 14, into which the volume flow meter 13 is integrated. In particular, FIGS. 4, 8 show that the housing 16 of the pressure reducer 15 forms, on the one hand, an upstream, in relation to the volume flow meter 13, section 14a of the bypass 14 and, on the other hand, a downstream, in relation to the volume flow meter 13, section 14b of the bypass 14.

Between the upstream section 14a of the bypass 14 and the downstream section 14b of the bypass 14, the housing 16 of the pressure reducer 14 forms a recess 22, which serves the purpose of accommodating the volume flow meter 13. The volume flow meter 13 is arranged in such recess 22, and in fact in such a manner that the flow channel 23 of the volume flow meter 13 communicates with the upstream section 14a and the downstream section 14b of the bypass 14.

A cover 26 covers the volume flow meter 13 in the mounted state. The cover 26 has at least one snap-hook-like or barb-like securing element 27 on at least one side, which engages in a respective groove 28 or notch on the housing, in order to secure the cover 26 to the housing 16, and thus the volume flow meter 13 in the recess 22 of the housing 16.

The volume flow meter 13 can be inserted into a single defined position into recess 22 of the housing 16 without tools, and can be covered by the cover 26. For this purpose, a sensor housing of the volume flow meter 13 has at least one notch 29 that works together with a projection on the housing 16 and/or a projection on the cover 26. Thus, an incorrect installation of the volume flow meter 13 in the opposite direction to the required flow direction can be avoided.

Sealing elements 30, which are provided on connection pieces of the volume flow meter 13, seal the volume flow meter 13 in the installed state on the housing 16, in order to seal the interfaces of the flow channel 23 of the volume flow meter 13 relative to the sections 14*a*, 14*b* of the bypass 14.

The invention enables the measurement of small leakages in a drinking water supply system with little effort. Leakages on the order of magnitude of 2 droplets per minute to 400 droplets per minute can be detected.

The volume flow meter 13 can be replaced easily and without tools. The recess 22 of the housing 16, which is used to accommodate the volume flow meter 13, is easily accessible.

Preferably, the assembly according to the invention comprises the pressure reducer 15 in addition to the backflow preventer 12 and the volume flow meter 13, wherein the housing 16 of the pressure reducer 15 accommodates both the backflow preventer 12 and the volume flow meter 13.

Such a structural unit can be easily installed in a drinking water supply system. The volume flow meter 13 can be easily replaced.

LIST OF REFERENCE SIGNS

10 Assembly
11 Drinking water supply line
12 Backflow preventer
13 Volume flow meter
14 Bypass
14*a* Section
14*b* Section
15 Pressure reducer
16 Housing
17 Inlet
18 Outlet
19 Upstream pressure zone
20 Downstream pressure zone
21 Connection
22 Recess
23 Flow channel
24 Valve insert
25 Plug
26 Cover
27 Securing element
28 Groove
29 Notch
30 Sealing element

The invention claimed is:

1. An assembly, comprising:
a housing with an inlet and an outlet,
a backflow preventer within the housing,
wherein the backflow preventer is configured to open if there is a pressure drop caused by water consumption downstream of the backflow preventer as viewed in a flow direction of the water, and
wherein the backflow preventer is configured to close if there is no pressure drop caused by water consumption downstream of the backflow preventer as viewed in the flow direction of the water; and
a volume flow meter connected in parallel to the backflow preventer and via which, if the backflow preventer is closed, a leakage flow of water caused by a leakage in the water supply system downstream of the backflow preventer can be routed,
wherein the volume flow meter is integrated into a bypass to the backflow preventer,
wherein the housing forms the bypass and forms a recess,
wherein the volume flow meter is configured to be inserted in a single defined position into the recess without tools, and
wherein the volume flow meter is configured to be covered by a cover.

2. The assembly of claim 1, wherein the volume flow meter is configured for a measuring range of between 0.1 mL/min and 20 mL/min.

3. The assembly of claim 1, wherein the volume flow meter has a flow channel with a flow cross-section of between 2 mm and 4 mm.

4. The assembly of claim 1, wherein the bypass has a flow cross-section of between 2 mm and 4 mm.

5. The assembly of claim 1, further comprising a pressure reducer arranged upstream of the backflow preventer as viewed in the flow direction of the water.

6. The assembly of claim 1, wherein:
the housing has an upstream pressure zone coupled to the inlet, and a downstream pressure zone coupled to the outlet,
the pressure reducer has a valve insert in the housing and configured to, in a closed state, separate the upstream pressure zone from the downstream pressure zone and configured to, in an open state, connect the upstream pressure zone and the downstream pressure zone, and
the backflow preventer is integrated into at least one of the downstream pressure zone or the outlet.

7. The assembly of claim 6, wherein the bypass comprises:
an upstream section upstream of the volume flow meter; and
a downstream section downstream of the volume flow meter,
wherein the recess is between the upstream section and the downstream section, and
wherein a flow channel of the volume flow meter communicates with the upstream section and the downstream section.

8. A pressure reducer; comprising:
a housing having an inlet, an outlet, an upstream pressure zone coupled to the inlet, and a downstream pressure zone coupled to the outlet;
a valve insert in the housing and configured to, in a closed state, separate the upstream pressure zone from the downstream pressure zone and configured to, in an open state, connect the upstream pressure zone and the downstream pressure zone;
a backflow preventer integrated into the pressure reducer in at least one of the downstream pressure zone or the outlet,
wherein the backflow preventer is configured to open if there is a pressure drop caused by water consumption downstream of the backflow preventer, and
wherein the backflow preventer is configured to close if there is no pressure drop caused by water consumption downstream of the backflow preventer; and
a volume flow meter connected in parallel to the backflow preventer and configured such that, if the backflow preventer is closed, a leakage flow of water caused by a leakage in a water supply system downstream of the backflow preventer can be routed,
wherein the volume flow meter is integrated into a bypass to the backflow preventer formed by the housing, wherein the housing forms an upstream section of the bypass upstream of the volume flow meter, wherein the housing forms a downstream section of the bypass downstream of the volume flow meter, wherein the housing forms a recess between the upstream section and the downstream section, wherein the volume flow meter is positioned within the recess, wherein a flow channel of the volume flow meter communicates with the upstream section and the downstream section, wherein the volume flow meter is configured to be inserted in a single defined position into the recess of the housing without tools, and wherein the volume flow meter is configured to be covered by a cover.

9. The assembly of claim 1, wherein the backflow preventer is configured to at least one of:

open when the pressure drop downstream of the backflow preventer is at least greater than a limit value, or close when the pressure drop downstream of the backflow preventer is at least less than a limit value.

10. The assembly of claim 8, wherein the backflow preventer is configured to at least one of:

open when the pressure drop downstream of the backflow preventer is at least greater than a limit value, or close when the pressure drop downstream of the backflow preventer is at least less than a limit value.

11. A pressure reducer; comprising:

a housing having an inlet, an outlet, an upstream pressure zone coupled to the inlet, and a downstream pressure zone coupled to the outlet;

a valve insert in the housing and configured to, in a closed state, separate the upstream pressure zone from the downstream pressure zone and configured to, in an open state, connect the upstream pressure zone and the downstream pressure zone;

a backflow preventer integrated in at least one of the downstream pressure zone or the outlet, wherein the backflow preventer is configured to open if there is a pressure drop caused by water consumption downstream of the backflow preventer, and wherein the backflow preventer is configured to close if there is no pressure drop caused by water consumption downstream of the backflow preventer; and a volume flow meter connected in parallel to the backflow preventer and configured such that, if the backflow preventer is closed, a leakage flow of water caused by a leakage in the water supply system downstream of the backflow preventer can be routed, wherein the housing forms the bypass and forms a recess, and wherein the volume flow meter is configured to be inserted into a single defined position into the recess without tools, and covered by a cover.

12. The assembly of claim 11, wherein the backflow preventer is configured to at least one of:

open when the pressure drop downstream of the backflow preventer at least greater than a limit value, or close when the pressure drop downstream of the backflow preventer is at least less than a limit value.

* * * * *